(12) United States Patent
Barzman et al.

(10) Patent No.: US 11,756,448 B2
(45) Date of Patent: Sep. 12, 2023

(54) SYSTEM AND METHOD FOR AUTOMATED RISK ASSESSMENT FOR SCHOOL VIOLENCE

(71) Applicant: Children's Hospital Medical Center, Cincinnati, OH (US)

(72) Inventors: Drew Barzman, Evendale, OH (US); Yizhao Ni, Mason, OH (US)

(73) Assignee: Children's Hospital Medical Center, Cincinnati, OH (US)

( * ) Notice: Subject to any disclaimer, the term of this patent is extended or adjusted under 35 U.S.C. 154(b) by 1110 days.

(21) Appl. No.: 16/280,197

(22) Filed: Feb. 20, 2019

(65) Prior Publication Data

US 2019/0266912 A1   Aug. 29, 2019

Related U.S. Application Data

(60) Provisional application No. 62/635,760, filed on Feb. 27, 2018.

(51) Int. Cl.
*G09B 19/00* (2006.01)
*G09B 7/00* (2006.01)

(52) U.S. Cl.
CPC ............... *G09B 19/00* (2013.01); *G09B 7/00* (2013.01)

(58) Field of Classification Search
CPC .................................. G09B 19/00; G09B 7/00
USPC ......................................................... 434/236
See application file for complete search history.

(56) References Cited

U.S. PATENT DOCUMENTS

2013/0004931 A1*   1/2013   Attali .................. G09B 7/02
434/353

OTHER PUBLICATIONS

Neuman et al.; "Profiling school shooters: automatic text-based analysis"; Frontiers in Psychiatry (Year: 2015).*
Barzman et al.; "Brief Rating of Aggression by Children and Adolescents (BRACHA): Development of a Tool for Assessing Risk of Inpatients' Aggressive Behavior"; The Journal of the American Academy of Psychiatry and the Law; vol. 39; Nov. 2011; p. 170-179.
Barzman et al.; "Brief Rating of Aggression by Children and Adolescents (BRACHA): A Reliability Study"; The Journal of the American Academy of Psychiatry and the Law; vol. 40; Nov. 2012; p. 374-382.

(Continued)

*Primary Examiner* — Thomas J Hong
(74) *Attorney, Agent, or Firm* — BakerHostetler

(57) ABSTRACT

A system and method for predicting risk of violence for an individual (primarily school violence, but not limited to school violence) performs the following steps: (a) receiving responses to questions from an individual; (b) extracting by a computerized annotator words or phrases from the questions and responses; (c) assigning by the annotator extracted word(s) or phrase(s) to at least one of a plurality of pre-defined categories; and (d) automatically identifying and scoring words or phrases that could be classified into the pre-defined categories by a trained machine-learning engine to produce a score reflecting relative risk of violence by the individual. The pre-defined categories include: expression of violent acts or thoughts of the individual; expression of negative feelings, thoughts or acts of others; expression of negative feelings, thoughts or acts of the individual; expression of family discord or tragedies; and expression of protective factors.

10 Claims, 3 Drawing Sheets

(56) References Cited

OTHER PUBLICATIONS

Bernes et al.; "Conducting Adolescent Violence Risk Assessments: A Framework for School Counselors"; Professional School Counseling; vol. 10; Apr. 2007; p. 419-427.
Borum et al.; "What Can Be Done About School Shootings?: A Review of the Evidence"; Educational Researcher; vol. 39; 2010; p. 27-37.
Burdick-Will; "School Violent Crime and Academic Achievement in Chicago"; Sociology of Education; vol. 86; 2013; p. 343-361.
Deleger et al.; "Large-scale evaluation of automated clinical note de-identification and its impact on information extraction"; Journal of the American Medical Informatics Association; vol. 20; 2013; p. 84-94.
Douglas et al.; "HCR-20 Violence Risk Assessment Scheme: Overview and Annotated Bibliography"; Sep. 2010; 133 pages.
Ganzert et al.; "Analysis of respiratory pressure-volume curves in intensive care medicine using inductive machine learning"; Artificial Intelligence in Medicine; vol. 26; 2002; p. 69-86.
Hilterman et al.; "Predictive Validity of Risk Assessments in Juvenile Offenders: Comparing the Savry, PCL:YV, and YLS/CMI With Unstructured Clinical Assessments"; Assessment; vol. 21; 2014; p. 324-339.
Kors et al.; "A multilingual gold-standard corpus for biomedical concept recognition: the Mantra GSC"; J Am Med Inform Assoc; vol. 22; 2015; p. 948-956.
Lingren et al.; "Evaluating the impact of pre-annotation on annotation speed and potential bias: natural language processing gold standard development for clinical named entity recognition in clinical trial announcements"; Journal of the American Medical Informatics Association; vol. 21; 2014; p. 406-413.
McCoy et al.; "Neighborhood Crime and School Climate as Predictors of Elementary School Academic Quality: A Cross-Lagged Panel Analysis"; Am J Community Psychol; vol. 52; 2013; p. 128-140.
McGowan et al.; "The Predictive Validity of the Structured Assessment of Violence Risk in Youth in Secondary Educational Settings"; Psychological Assessment; vol. 23; 2011; p. 478-486.
Molnar et al.; "Effects of Neighborhood Resources on Aggressive and Delinquent Behaviors Among Urban Youths"; American Journal of Public Health; vol. 98; Jun. 2008; p. 1086-1093.
Mossman; "Assessing Predictions of Violence: Being Accurate About Accuracy"; Journal of Consulting and Clinical Psychology; vol. 62; 1994; p. 783-792.
Musu-Gillete et al.; "Indicators of School Crime and Safety: 2016"; Nat'l Center for Education Statistics U.S. Dept. of Education; May 2017; 261 pages.
Nekvasil et al.; "Student Reports of Peer Threats of Violence: Prevalence and Outcomes"; Journal of School Violence; vol. 11; 2012; p. 357-375.
Park-Higgerson et al.; "The Evaluation of School-Based Violence Prevention Programs: A Meta-Analysis"; Journal of School Health; vol. 78; Sep. 2008; p. 465-479.
Reed et al.; "Predictors of Long-Term School-Based Behavioral Outcomes in the Multimodal Treatment Study of Children with Attention-Deficit/Hyperactivity Disorder"; Journal of Child and Adolescent Psychopharmacology; vol. 27; 2017; p. 296-309.
Sara et al.; "High-School Dropout Prediction Using Machine Learning: A Danish Large-scale Study"; European Symposium on Artificial Neural Networks, Computational Intelligence and Machine Learning; Apr. 2015; p. 319-324.
Shultz et al.; "Fatal school shootings and the epidemiological context of firearm mortality in the United States"; Disaster Health; vol. 1; 2013; p. 84-101.
Singh et al.; "A comparative study of violence risk assessment tools: A systematic review and metaregression analysis of 68 studies involving 25,980 participants"; Clinical Psychology Review; vol. 31; 2011; p. 499-513.
Strom et al.; "Violence, bullying and academic achievement: A study of 15-year-old adolescents and their school environment"; Child Abuse & Neglect; vol. 37; 2013; p. 243-251.
Varma et al.; "Bias in error estimation when using cross-validation for model selection"; BMC Bioinformatics; vol. 7; 2006; 8 pages.
Wilbur et al.; "New directions in biomedical text annotation: definitions, guidelines and corpus construction"; BMC Bioinformatics; vol. 7; 2006; 10 pages.
Zacharaki et al.; "Classification of Brain Tumor Type and Grade Using MRI Texture and Shape in a Machine Learning Scheme"; Magnetic Resonance in Medicine; vol. 62; 2009; p. 1609-1618.
"School-Associated Violent Death Study"; https://www.cdc.gov/violenceprevention/youthviolence/schoolviolence/SAVD.html; Centers for Disease Control and Prevention; Oct. 2019; accessed Nov. 7, 2019; 2 pages.
https://www.nasponline.org/educators/index.aspx#crisis— (Webpage no longer exists).
Gottfredson et al.; "Schools and Prevention"; Crime and Prevention; Chapter 14; 2000; p. 269-287.
Tanner-Smith et al.; Risk Factors and Crime; The Oxford Handbook of Criminological Theory; $5^{th}$ edition; 2012; 42 pages.
Mytton et al.; "School-based secondary prevention programmes for preventing violence (Review)"; Cochrane Database System Review; 2009; 56 pages.
Monahan et al.; "Violence risk assessment: A quarter century of research"; American Psychological Association; 2001; p. 195-211.
Xia et al.; "Clinical Corpus Annotation: Challenges and Strategies"; Third Workshop on Building and Evaluating Resources for Biomedical Text Mining of the Int'l Conf. on Language Resources and Evaluation; 2012; 8 pages.
Barzman et al.; "A Pilot Study on Developing a Standardized and Sensitive School Violence Risk Assessment with Manual Annotation"; Psychiatric Quarterly; vol. 88; 2017; p. 447-457 (abstract only).
Delgado et al.; "Characteristics of Discharges Against Medical Advice from Acute Inpatient Psychiatric Units for Children Adolescents"; Poster presented at the annual Meeting of the American Academy of Child and Adolescent Psychiatry; Boston; 2007— (Unable To Locate Document).
O'Toole et al.; "The School Shooter: A Threat Assessment Perspective"; FBI Federal Bureau of Investigation; 1999; 52 pages.
Zrimec et al.; "Feasibility analysis of machine learning in medical diagnosis from aura images"; Journal Consciousness and Physical Reality; 1999; 10 pages.
Welsh et al.; "A Comparative Study of Adolescent Risk Assessment Instruments Predictive and Incremental Validity"; Assessment; vol. 15; Mar. 2008; p. 104-115.
Janofsky et al.; "Psychiatrist's Accuracy in Predicting Violent Behavior on an Inpatient Unit"; Hospital and Community Psychiatry; vol. 39; Oct. 1988; p. 1090-1094.
Neuman et al.; "Profiling school shooters: automatic text-based analysis"; Frontiers in Psychiatry—Methods Article; 2015; 15 pages.
Flannery et al.; "Violence and School Shootings"; Current Psychiatry Reports; vol. 15; 2013; 7 pages.

* cited by examiner

SYSTEM AND METHOD FOR AUTOMATED RISK ASSESSMENT FOR SCHOOL VIOLENCE

CROSS REFERENCE TO RELATED APPLICATIONS

The current application claims priority to U.S. Provisional Application, Ser. No. 62/635,760, filed Feb. 27, 2018, the entire disclosure of which is incorporated by reference.

BACKGROUND

Between July 2013 and June 2014, there were a total of 48 school-associated violent deaths in the United States. Victims of these school-associated deaths included students, staff, and nonstudents. Of these deaths, 12 homicide victims and 8 suicide victims (42%) were between the ages of 5 and 8. In 2015, the rate of violent victimization for students ages 12-18 was higher at school than away from school [1, 2]. School violence has a far reaching effect, impacting the entirety of a school population including staff and students. Studies have shown that there is poorer scholastic achievement and school attendance, along with higher dropout rates for youths attending the most violent schools [3-6].

There has been an increasing understanding of school-based crime prevention, of effective prevention programs, and also of what individual risk factors and school-related characteristics relate to crime [7, 8]. The most significant results of crime-prevention occur when youth at elevated risk are given a specific school-based prevention program [7, 9]. Although there has been progress in the area of school-violence prevention, much work is still necessary to improve the current school violence risk assessment approach for mild, moderate, and severe violence. To establish a more sensitive and effective method for assessing school violence risk levels, risk factors, and protective factors, a more sophisticated approach is needed [10].

Previously, a school-based violence risk assessment that carefully evaluates the specific content of language used by students in middle and high school has not been widely accepted. Instead, students' risk levels are determined based on clinicians' impression during the students' risk assessment. No risk assessment approach has incorporated direct analysis of students' interviews and therefore, yielded little information to guide the work of threat assessment teams [11, 12]. Paper risk assessments for violence, ranging from simple clinical impressions to structured professional judgements, have been proposed but their correct identification rates of violent youth plateaued at less than 50% [13-16]. As such, a more sensitive school violence risk assessment approach may be achieved by understanding students' language.

SUMMARY

Current methods for school violence risk assessments are neither sensitive nor rapid, and have not been standardized. Compared to clinical impressions, using manual annotation could reduce clinical subjectivity in risk assessments. Manual annotation allows researchers to directly analyze the students' interviews and understand the behaviors, attitudes, feelings, language, technology use, and other activities they mentioned during their interviews. With manual annotation, identification and understanding of risk and protective factors have been achieved more objectively and sensitively than with previously available violence risk assessment methods. In addition, manual annotation helps with the future development of a computerized system (machine learning) that will automatically identify such information within interviews [17-19]. The current disclosure incorporates machine learning to complete the annotation process. In such a system the violence risk assessment can be performed substantially in real-time during the student interview, for example, to provide useful insights.

It is one aspect of the current disclosure to provide a system and a method for predicting risk of violence for an individual (primarily school violence, but not limited to school violence). The system and method performs the following steps: (a) receiving responses to questions from an individual in a digital form; (b) extracting by a computerized annotator words or phrases from the digital form of the questions and responses; (c) assigning by the annotator extracted word(s) or phrase(s) to at least one of a plurality of pre-defined categories; and (d) automatically scoring words or phrases that could be classified into the pre-defined categories by a trained machine-learning engine to produce a score reflecting relative risk of violence by the individual. The pre-defined categories include: expression of violent acts or thoughts of the individual; expression of negative feelings, thoughts or acts of others; expression of negative feelings, thoughts or acts of the individual; expression of family discord or tragedies; and expression of protective factors.

In a more detailed embodiment, the pre-defined categories also include one or more of the following: expression of illegal acts or contact with the judicial system by the individual, expression of violent media or video games, expression of self-harm thoughts or acts of the individual, expression of family discord or tragedies, expression of psychiatric diagnosis or symptoms, and expression of positive feelings, thoughts or acts of the individual. In a further detailed embodiment, the pre-defined categories also include each of these additional categories. Alternatively, or in addition, the pre-defined categories also include expression of verbal or physical response due to emotions of the individual.

In a more detailed embodiment, the questions to the individual were given from a pre-set questionnaire. In yet a further detailed embodiment, the questionnaire asks open-ended questions. In yet a further detailed embodiment, the questionnaire is School Safety Scale questionnaire, which is based on the Historical-Clinical Risk Management-20 (HCR-20) questionnaire.

In a detailed embodiment, the trained machine-learning engine further generates warning markers from the identified words or phrases. In a further detailed embodiment, the warning markers are identification of specific assigned words or phrases, and/or generation of risk factors from the assigned words or phrases. Alternatively, or in addition, the trained machine-learning engine further considers demographic, socioeconomic status, social determinant, or environmental factor data of the individual in the scoring step. Alternatively, or in addition, the scoring step utilizes a Pearson Correlation coefficient. Alternatively, or in addition, the annotator utilizes natural language processing algorithms.

In another aspect, a system and method for assessing risk of violence (primarily, but not limited to, school violence) includes the following steps: receiving a digital natural language transcript of an individual in response to questions; converting the transcript to a predetermined form; extracting linguistic features from the transcript; assigning the extracted features automatically to at least one of a plurality of pre-determined categories; scoring the assigned features by machine learning engine based on predetermined indicators; and producing a risk of violence score for the individual to prevent violence. In a more detailed embodiment, the step of converting a digital natural language transcript to a predetermined form includes: tokenizing and lemmatizing the digital transcript; removing punctuation from the transcript; and/or converting negated and temporal terms. Alternatively or in addition, the questions comprise an open-ended format.

In a detailed embodiment, the step of extracting features from the transcript includes: extracting a first feature set into semantic meaning categories; and extracting a second feature set of term frequency and inverse transcript frequency. In a further detailed embodiment, the step of extracting into semantic meaning categories includes: a linguistic inquiry and word count dictionary mapping specific words into 45 categories; and using word embedding to cluster words into 100 word categories. Alternatively, the step of extracting a second feature set further includes both semantic and context information.

In an alternate detailed embodiment, the predefined categories includes: expression of negative feelings, thoughts, or acts of others; expression of positive feelings, thoughts, or acts of the individual; expression of family discord or tragedies; expression of violent acts or thoughts by the individual; and/or expression of protective factors. In a further detailed embodiment, the predefined categories further include: expression of psychiatric diagnosis or symptoms; expression of negative feelings, thoughts, or acts of the individual; expression of illegal acts or contact with the judicial system by the individual; engaging in violent acts or expressing violent thoughts by the individual; expression of self-harm thoughts or engaging in self-harm acts by the individual; and/or violent media or video games. In a further detailed embodiment, the pre-defined categories further include expression of verbal or physical response due to emotions of the individual.

In an alternate detailed embodiment, the machine learning engine comprises: multivariate logistic regression with L1 and L2 normalization; support vector machines with polynomial and radial basis function kernels; artificial neural networks; decision trees; and/or random forests. In a further detailed embodiment, the machine leaning further comprises the use of a best-first search algorithm to select and identify key second feature extractions most closely indicative of risk of school violence.

DETAILED DESCRIPTION

Figure 1:
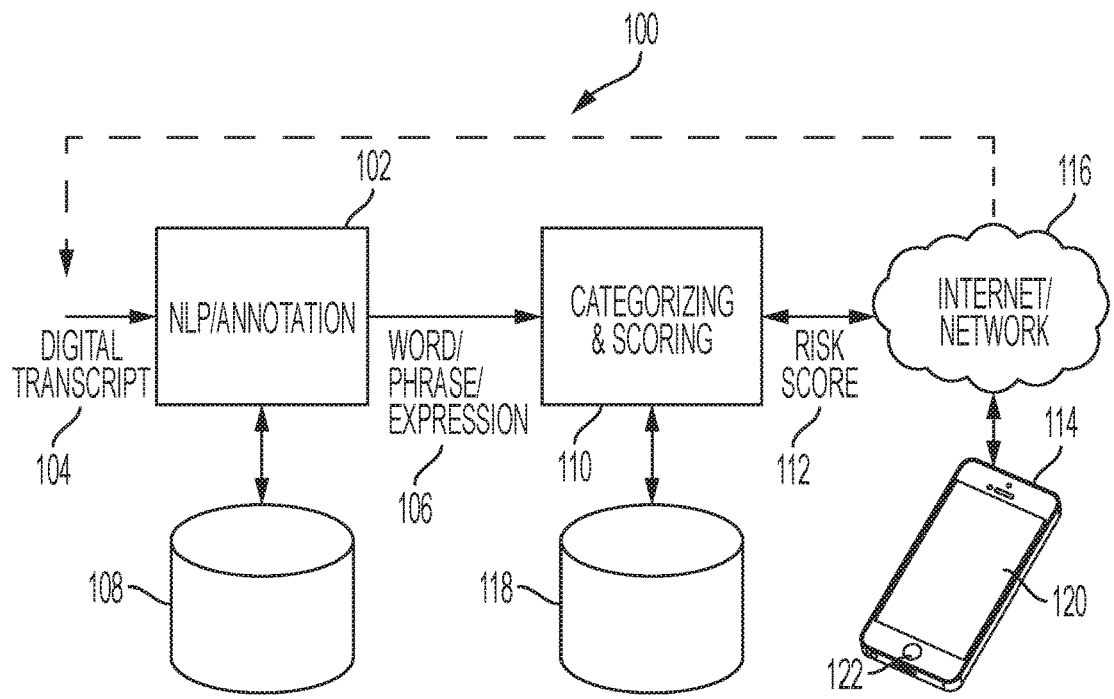
FIG. 1 provides an exemplary system for practicing embodiments of the current disclosure.

Embodiments of the current disclosure provide is an automated system (and associated methods) that assesses risk of school violence to augment professional judgement.

In some embodiments, the assessment may occur in real-time or substantially in real-time (i.e, within seconds or within several minutes). The technology includes protocol to interview participants with two school safety scales. By analyzing the interview content, this system automatically assesses participants' risk levels and identifies risk factors that need to be addressed. The advantage of this technology is that it establishes an efficient and effective method to assess adolescents who may be at risk for school violence. The system may help establish a comprehensive screening tool for school violence prevention. Embodiments of the technology can be used in schools, hospitals, and clinics. It is also likely that this service can be applied for background checks for adults who want to purchase guns.

While the detailed embodiments have been developed for use in determining relative risk of school violence, it will be apparent that the disclosure may also be used for many related areas, such as: background checks for adults who may want to buy guns, emergency room evaluations of children and adolescents, clinical evaluations at pediatrician offices and mental health agencies, evaluations within juvenile justice centers, criminal evaluations for the courts, custody evaluations of parents for the courts, government use, colleges, graduate schools, and/or military use.

Participant Interview. A Demographic Form along with two 14-item school safety scales, the Brief Rating of Aggression by Children and Adolescents (BRACHA) and the School Safety Scale (SSS) are provided to the participant (e.g., student or juvenile). In addition, the Psychiatric Intake Response Center (PIRC) assessment, which has been used at our hospital over the past decade, may also be provided to the participant. Collateral information may also gathered from the participant's guardians using some questions taken from the two school safety scales, BRACHA and SSS, and the PIRC assessment.

The BRACHA questionnaire is a 14-item instrument, which has predictive performance for aggression by children and adolescents in CCHMC. The SSS questionnaire was developed by modifying the Historical-Clinical-Risk Management-20 (HCR-20) scale to evaluate risk and protective factors associated with school violence for children and adolescents. The HCR-20 is a widely-used, valid and reliable scale for the prediction of violence by adults and includes ten historical items (irreversible), five current clinical items (reversible), and five future risk management (reversible) items. The HCR-20, the BRACHA, and the SSS overlap in areas that have been identified as important correlates to youth violence. The PIRC assessment, which is not a scale, allows for a semi-structured format that helps gather background information with open-ended and direct questions. The scales and assessment are consistent with the information from five domains including community, school, peer, family, and individual. The PIRC assessment incorporates the FBI's Four-Pronged Assessment Model to examine the personality of the participant (behavior characteristics and traits), school dynamics, social dynamics, and family dynamics. Example questions can be found in [20], as follows:

TABLE 1

Abbreviated BRACHA 0.9 Items and Response Options:

| Item | Abbreviated BRACHA Items | Response Options | |
|---|---|---|---|
| 1 | Previous psychiatric hospitalization or day treatment placement | ☐ Yes | ☐ No |

TABLE 1-continued

Abbreviated BRACHA 0.9 Items and Response Options:

| Item | Abbreviated BRACHA Items | Response Options | |
|---|---|---|---|
| 2 | School suspension or expulsion | ☐ Yes | ☐ No |
| 3 | Trouble accepting adult authority at home or at school | ☐ Little or none<br>☐ Some | ☐ A lot |
| 4 | Frequency of physical aggression toward others (e.g., hitting, kicking punching, biting, slapping, fights at school, throwing objects at others) | ☐ Never<br>☐ Occasionally<br>☐ Often | |
| 5 | Impulsiveness in the emergency department (e.g., often needing redirection, throwing objects, running out of the room, yelling at the interviewer, extremely talkative, etc.) | ☐ No Incidents<br>☐ One or more incidents | |
| 6 | Intrusiveness in the emergency department (e.g., invading personal space, asking personal questions, etc.) | ☐ No incidents<br>☐ One or more incidents | |
| 7 | Attempts to harm others or violent acts with intent to seriously harm others (includes all weapons use, even without injury, if used with harmful intent) | ☐ Never<br>☐ Once<br>☐ More than once | |
| 8 | Violent ideation towards others (i.e., thoughts, wishes, or desires to harm other people) | ☐ Never<br>☐ Occasionally<br>☐ Often | |
| 9 | Actual expressions of violent intentions or plans to hurt others (includes text messages and e-mails) | ☐ Never<br>☐ Occasionally<br>☐ Often | |
| 10 | Acts that intentionally destroyed property (e.g., breaking objects, vandalism, fire setting, making holes in the walls; does not include accidents or throwing things) | ☐ Never<br>☐ Occasionally<br>☐ Often | |
| 11 | Threats or physical aggression towards self or others in the past 24 hours | ☐ Yes | ☐ No |
| 12 | Pattern of either verbal or physical aggression towards self or others | ☐ Yes | ☐ No |
| 13 | Aggressive behavior before age 10 years (e.g. firesetting, destruction of property, stealing, trying to seriously hurt a person or animal, bullying, frequent fights; does not include lying) | ☐ Never<br>☐ Occasionally<br>☐ Often | |
| 14 | Signs of remorse (such as responsibility, shame, and/or guilt) after violence or aggressive acts | ☐ Not aggressive, or if aggressive, displays remorse, guilt, shame, or responsibility<br>☐ If aggressive, displays no remorse, guilt, shame, or sense of responsibility | |

The School Safety Scale (SSS) employs a combination of both broad and specific questions related to violence risk factors. Questions were asked in an open-ended format so that the participant provides more detailed answers than "yes" or "no." In cases where the participant answers with a yes or no, the participant is asked to explain his or her answer. The wording of the questions may be dependent on the student's age and cognitive level. Questions may also be asked based on background information gathered before the interviews from the schools and guardians.

Annotation. In an embodiment, the interviews of the subjects are recorded and immediately transcribed in a text or digital format. Key phrases and words associated with school violence risk are extracted from the transcribed interviews, preferably using a trained machine-learning annotation engine. The focus during annotation is to identify students' behaviors, attitudes, feelings, and uses of technology (social media and video games) with human disambiguation. School violence-related patterns are identified by the annotation engine within the students' interviews, and may be double annotated using a double annotation schema. The trained annotation engine identifies key words and phrases associated with students' behaviors from the interviews. Each extracted word or phrase may be standardized by the annotation engine by being assigned to one of 11 pre-defined categories. The 11 categories for annotation are: (1) Psychiatric diagnosis or symptoms, (2) Negative feelings, thoughts, or acts of subject, (3) Negative feelings, thoughts, or acts of others, (4) Positive feelings, thoughts, or acts of subject, (5) Illegal acts or contact with the judicial system by subject, (6) Violent acts or thoughts of subject, (7) Self-harm thoughts or acts of subject, (8) Family discord or tragedies, (9) Verbal or physical response due to emotions of subject, (10) Violent media or video games, (11) Protective factors (e.g., family support counselor). After annotation was completed, a consensus may be manually established by a child and adolescent forensic psychiatrist to resolve any discrepancies in the annotation engine decisions.

During development of exemplary embodiments, a reference set of school violence-related patterns was generated from the consensus of the extracted words and phrases and their corresponding categories. The statistical analysis on the annotations (manual annotations in this example) showed that there were significant language differences between the high risk and low risk groups for the following five annotation categories: negative feelings/thoughts/acts of subject, negative feelings/thoughts/acts of others, illegal acts or contact with the judicial system by subject, violent acts or thoughts of subject, and violent media or video games (p values<0.05).

The following process is performed in a detailed embodiment of Automated Risk Assessment. The participant interviews are tokenized and lemmatized, after which the punctuations are removed and the negated terms are converted. Two levels of features are then extracted from the processed interviews. The first feature set is created with word categories that summarized semantic meaning of the interviews. The Linguistic Inquiry and Word Count (LWIC) dictionary is applied to map specific words into 45 categories related to positive/negative emotions, perceptions, personal concerns, and cognitive processes. Word embedding is used to cluster words into 100 word categories (WEC) in an unsupervised manner. The second feature set is n-grams (n<5) with term frequency-inverse document frequency weighting to capture both semantic and context information. To predict risk of school violence, this embodiment uses three machine learning algorithms including multivariate logistic regression with L1 and L2 normalization, support vector machines with polynomial and radial basis function kernels, and random forests. To capture potential warning markers associated with school violence, this embodiment applies an iterative step-forward approach with "best first" search to select and identify key n-grams. By analyzing the content from participant interviews, the machine learning detect risk of school violence for individual students. In addition, identification of key predictors reveals multiple warning markers that could deliver useful insights into potential causes of school violence.

Embodiments of the current disclosure may provide two outcomes: a risk score and/or a set of warning markers (i.e., text content of risk factors). The risk score will inform if clinical intervention is required. However, to deliver useful insights into potential causes of school violence, warning markers may be identified from the interview content.

Embodiments of the current disclosure leverage machine learning technologies, including conditional random fields and recurrent neural networks to detect linguistic descriptors (i.e., raw text of the annotation categories) associated with students' violent behaviors. The detected warning markers will help generate actionable recommendations to inform individualized clinical and school interventions. The combination of the two outcomes may complete the attainment of the system's overall objective of automating school violence risk assessments.

FIG. 1 provides an exemplary system 100 that may be implemented to practice embodiments of the current disclosure. The system 100 may include a Natural Language Processor and/or Annotation Engine 102 that performs the processes, as described herein in detail, associated with receiving a digital transcript 104 of the individual's responses to the posed questions and for identifying and extracting words or phrases (or other forms of expression) 106 from the digital transcript. The extracted words or phrases 106 are extracted based upon a trained classifier and/or other form of a rule-set contained in database 108. The extracted words/phrases 106 are received by the Categorizing & Scoring Engine 110, which assigns the extracted words/phrases 106 to one or more pre-determined categories, as described herein in detail, and also scores each of the assigned words/phrases. The Categorizing & Scoring Engine 110 compiles the categorized and weighted words/phrases to produce an overall risk score 112, which is provided to a user's computerized and networked user interface device 114 via the Internet or some other network 116. As shown in FIG. 1, the digital transcript 104 may be provided by the user's computerized and networked user interface device 114 to the system 100 via the network 116. The Categorizing & Scoring Engine 110 may operate based upon trained classifiers and/or other forms of rule-sets contained in database 118.

The computerized and networked user interface device 114 can be in the form of a smart phone, a tablet computer, a laptop or desktop computer, smart display, personal assistant device, a computerized wearable appliance such as a smart watch or smart glasses, and the like. The computerized and networked user interface device 114 may include a display 120, and a user input device such as a cursor control device 122 (or a touch screen or a voice activated control, or a motion sensor, or an eye movement sensor and the like as are readily available to the art), a camera and associated processing circuitry. The computerized and networked user interface device 114 may operate to perform various software applications such as a computerized tool which may be in the form of a personal application associated with presenting the questionnaires, receiving and recording the user's answers and for presenting the risk scores and other output (as described herein) to the user. In the current embodiment, the application may include a graphical user interface displayed on the display screen 120 and controlled and/or receive user input therein from the user input devices such as the cursor-controlled device 122 and/or a touch screen. The user device circuitry may include a network circuit for connecting wirelessly with the computer network 116 for the purpose of receiving and/or transmitting data over the computer network 116.

The system 100 may utilize various computer servers and/or distributed computing devices also accessible thereto and may additionally include various data storage devices 108/118 operatively coupled by a data connection thereto. For example, the software application may include operations being performed on one or more of the computer servers/devices and/or on the device circuitry. Likewise, data storage associated with the software application may be within one or more of the data storage devices 108/118 and/or on the device circuitry.

Figure 2:
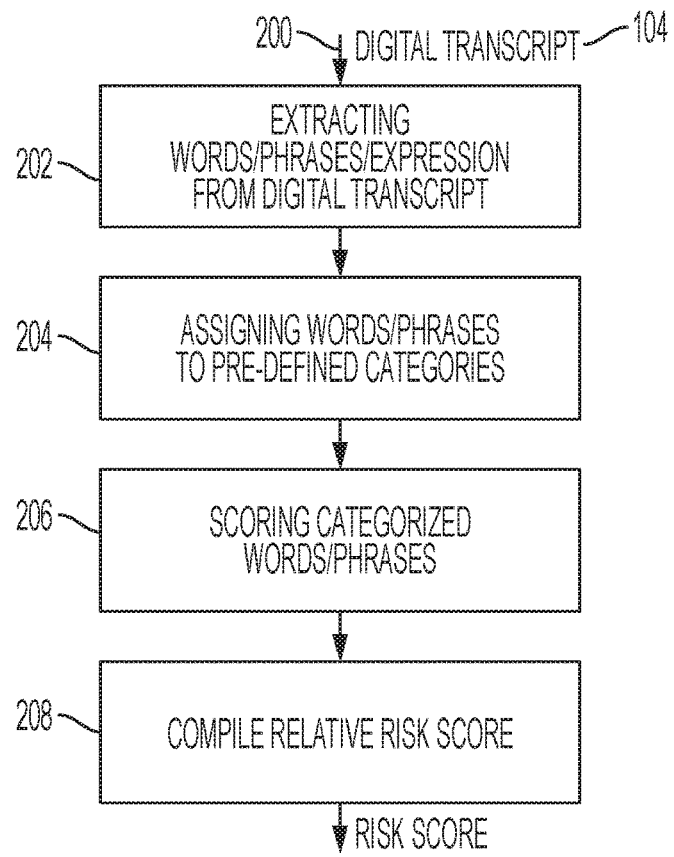
FIG. 2 provides a flow diagram of an exemplary method according to an embodiment of the current disclosure.

As shown in FIG. 2, a method for predicting risk of violence for an individual (primarily school violence, but not limited to school violence) performs the following steps: (200) receiving responses to questions from an individual in a digital form (e.g., receiving the digital transcript 104); (202) extracting by a computerized annotator words or phrases from the digital form of the questions and responses; (204) assigning by the annotator extracted word(s) or phrase (s) to at least one of a plurality of pre-defined categories; (206) automatically weighing words and/or phrases that could be classified into the pre-defined categories by a trained machine-learning engine; and (208) to produce a score 112 reflecting relative risk of violence by the individual from a compilation of the categorized and scored words and/or phrases. In an embodiment, the risk score 112 is produced as a result of a simple summation of the scored words and/or phrases. But it will be appreciated that there are numerous alternative ways to compile an overall risk score from the scored words and/or phrases. The pre-defined categories include: expression of violent acts or thoughts of the individual; expression of negative feelings, thoughts or acts of others, expression of negative feelings, thoughts or acts of the individual, expression of family discord or tragedies, and expression of protective factors.

In a more detailed embodiment of FIG. 2, the pre-defined categories also include one or more of the following: expression of illegal acts or contact with the judicial system by the individual, expression of violent media or video games, expression of self-harm thoughts or acts of the individual, expression of family discord or tragedies, expression of psychiatric diagnosis or symptoms, and expression of positive feelings, thoughts or acts of the individual. In a further detailed embodiment, the pre-defined categories also include each of these additional categories. Alternatively, or in addition, the pre-defined categories also include expression of verbal or physical response due to emotions of the individual.

In a more detailed embodiment of the method of FIG. 2, the questions to the individual were given from a pre-set questionnaire. In yet a further detailed embodiment, the questionnaire asks open-ended questions. In yet a further detailed embodiment, the questionnaire is School Safety Scale (SSS) questionnaire, which is based a modified version of the Historical-Clinical Risk Management-20 (HCR-20) questionnaire. The Brief Rating of Aggression by Children and Adolescents (BRACHA) questionnaire is a separate questionnaire that may be used alone or in addition to the SSS.

In an alternate detailed embodiment the method of FIG. 2, the trained machine-learning engine further generates warning markers from the identified words or phrases. In a further detailed embodiment, the warning markers are identification of specific assigned words or phrases, and/or generation of risk factors from the assigned words or phrases. Alternatively, or in addition, the trained machine-learning engine further considers demographic, socioeconomic status, social determinant, or environmental factor data of the individual in the scoring step. Alternatively, or in addition, the scoring step (206) utilizes a Pearson Correlation coefficient. Alternatively, or in addition, the annotator utilizes natural language processing algorithms.

Figure 3:
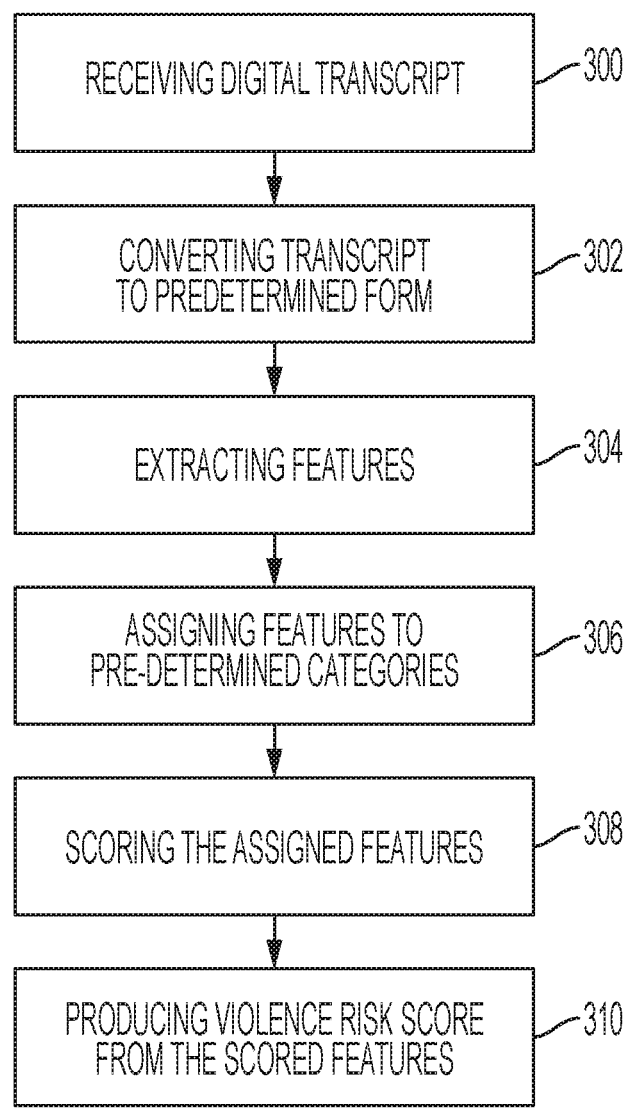
FIG. 3 provides a flow diagram of an exemplary method according to an embodiment of the current disclosure.

As shown in FIG. 3, another embodiment provides a system and method for assessing risk of violence (primarily, but not limited to, school violence) that includes the following steps: (300) receiving a digital natural language transcript of an individual in response to questions; (302) converting the transcript to a predetermined form; (304) extracting features from the transcript; (306) assigning the extracted features automatically to at least one of a plurality of pre-determined categories; (308) scoring the assigned features by machine learning engine based on predetermined indicators; and (310) producing a risk of violence score for the individual to prevent violence. In a more detailed embodiment, the step of converting a digital natural language transcript to a predetermined form includes: tokenizing and lemmatizing the digital transcript; removing punctuation from the transcript; and/or converting negated and temporal terms. Alternatively or in addition, the questions comprise an open-ended format.

In a detailed embodiment of the method of FIG. 3, the step (304) of extracting features from the transcript includes: extracting a first feature set into semantic meaning categories; and extracting a second feature set of term frequency and inverse transcript frequency. In a further detailed embodiment, the step of extracting into semantic meaning categories includes: a linguistic inquiry and word count dictionary mapping specific words into 45 categories; and using word embedding to cluster words into 100 word categories. Alternatively, the step of extracting a second feature set further includes both semantic and context information.

In an alternate detailed embodiment of the method of FIG. 3, the predefined categories include: expression of negative feelings, thoughts, or acts of others; expression of positive feelings, thoughts, or acts of the individual; expression of family discord or tragedies; expression of violent acts or thoughts by the individual; and/or expression of protective factors. In a further detailed embodiment, the predefined categories further include: expression of psychiatric diagnosis or symptoms; expression of negative feelings, thoughts, or acts of the individual; expression of illegal acts or contact with the judicial system by the individual; engaging in violent acts or expressing violent thoughts by the individual; expression of self-harm thoughts or engaging in self-harm acts by the individual; and/or violent media or video games. In a further detailed embodiment, the predefined categories further include expression of verbal or physical response due to emotions of the individual.

In an alternate detailed embodiment of the method of FIG. 3, the machine learning engine comprises: multivariate logistic regression with L1 and L2 normalization; support vector machines with polynomial and radial basis function kernels; artificial neural networks; decision trees; and/or random forests. In a further detailed embodiment, the machine leaning further comprises the use of a best-first search algorithm to select and identify key features most closely indicative of risk of school violence.

Technology Development Example I

Researchers conducted evaluations on 103 (49% male to 51% female ratio) participants who were recruited from the Cincinnati Children's Hospital Medical Center inpatient units, outpatient clinics and Emergency department. Participants ranged from ages 12-18 and were actively enrolled in 74 traditional public schools (non-online education). All participants were not in the custody of the state or county. Collateral from guardians was gathered prior to participant evaluation. An open-ended list of questions was used to initiate the evaluations. Each participant was also asked questions from the Brief Rating of Aggression by Children and Adolescents (BRACHA-School Version) and the School Safety Scale (SSS). Evaluations were recorded and transcribed into text documents. Results: The 103 transcripts were annotated using a carefully created set of guidelines, where the keywords identified were placed into one of twelve specific categories (e.g., "impulsivity", "negative feelings, thoughts or acts of subject" and "negative feelings, thoughts or acts of others"). A Pearson Correlation coefficient was conducted, showing trending significance of "Risk to others" with five annotation categories. "Negative feelings thoughts or actions of subject" (0.48), "Negative feelings thoughts or acts of others" (0.40), "Illegal acts or contact with the Judicial system by subject" (0.31), "Violent media or video games" (0.44) and "Violent acts or thoughts of subjects" (0.68) all showed a positive correlation. An unpaired T-test was conducted and results for each of these categories were found to be significant at the P<0.01 level. By leveraging natural language processing and machine learning technologies, we further developed a computerized model to automatically analyze interview transcripts and predict if a student has high risk of violence towards others. The area under the ROC curve achieved by the model was 91.4%, indicating that more than 90% of subjects received.

Technology Development Example II

This study focused on developing a machine learning (ML) model to predict risk of school violence and to identify risk characteristics for individual students.

Participants and inclusion criteria. During the study period we prospectively recruited 101 students from 74 middle and high schools in Ohio, Kentucky, Indiana, and Tennessee. The students were directly referred to our risk assessment team from schools, or from inpatient and outpatient clinics. We focused on referrals for students who 1) had any significant behavioral change and concern, verbal/physical aggression, or threats toward others or property, 2) had self-harm thoughts and behaviors, and 3) had behavioral changes of becoming odd, quite, withdrawn, or isolative. All legal guardians consented and all students assented for the study (consent rate=100%).

School violence risk assessment. A risk assessment was completed as soon as possible from the initial referral. The research team interviewed a student with three scales: 1) Brief Rating of Aggression by Children and Adolescents (BRACHA) that assesses aggression by children and adolescents, 2) School Safety Scale (SSS) that evaluates risk and protective factors for school violence behaviors, and 3) Psychiatric Intake Response Center (PIRC) assessment that collects background information including community, school, peer, family, and individual. All questions were asked in an open-ended format so that the student would provide more detailed answers than "Yes/No". The wording of the questions was dependent on the student's age and cognitive level. The interview was audio recorded and transcribed thereafter. Table 2 shows the descriptive statistics of the scales and transcripts. By reviewing the interview and collateral information from the guardians, the research team assessed the student's behaviors, attitudes, feelings, and technology use (e.g., social media) to determine their risk level towards others (low or high).

Predicting risk of school violence. In the study we sought to predict students' risk levels based on their interviews and home information. Clinical judgments for the 101 students served as gold standard to train and evaluate the predictive models. The baseline was a predictive model based on home information including demographics and socioeconomic status (home income, education, and public assistance). The student interviews were tokenized and lemmatized, after which the punctuations were removed and the negated terms were converted. We then extracted two levels of features from the processed interviews. The first feature set was created with word categories that summarized semantic meaning of the interviews. The Linguistic Inquiry and Word Count (LWIC) dictionary was applied to map specific words into 45 categories related to positive/negative emotions, perceptions, personal concerns, and cognitive processes. We also used word embedding to cluster words into 100 word categories (WEC) in an unsupervised manner. The second feature set was n-grams (n<5) with term frequency-inverse document frequency weighting to capture both semantic and context information. To predict risk of school violence, we used three standard machine learning algorithms including multivariate logistic regression (LR) with L1 and L2 normalization, support vector machines with polynomial (SVM-P) and radial basis function (SVM-R) kernels, and random forests (RF). A nested ten-fold cross-validation was utilized in training and testing the algorithms so that we could evaluate model performances on all 101 examples. We used the area under the receiver operating characteristic curve (AUC) as the primary measure for evaluation. To capture potential warning markers associated with school violence, we applied an iterative step-forward approach (SVM-P) with "best first" search to select and identify key n-grams.

Figure 4:
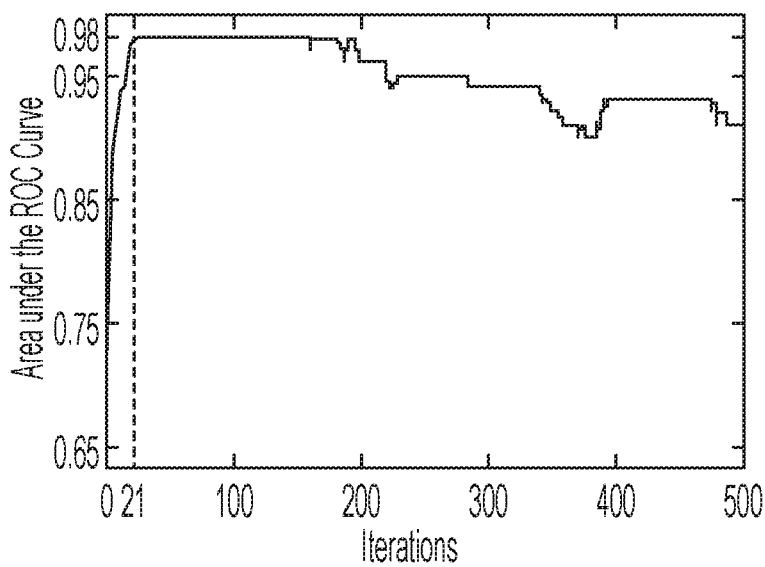
FIG. 4 provides an AUC curve associated with a technology development example provided herein.

Results. Based on clinical judgment, 54 students (53%) were considered high risk towards others. There was no significant difference in demographics between the high risk and low risk groups. However, risk of violence increased significantly with a lower socioeconomic status (p-value=0.05 for public assistance and p-value=0.01 for household income under Chi-square test). Table 3 presents the performances of the ML algorithms with different feature sets. The best-performing algorithm was SVM-P with n-gram features from the BRACHA scale (AUC=93.03%), where the improvements over algorithms with individual feature sets (e.g., individual word categories, n-grams from SSS and PIRC) were statistically significant. FIG. 4 shows the AUC curve when incrementally adding the first 500 n-gram features using best first search. By utilizing only 21 n-gram features, a SVM classifier plateaued at an AUC of 98.02%. To identify violence warning markers, we present in Table 4 predictors from the top 21 n-grams that were also significantly associated with school violence under Chi-square test (p-value<0.05).

Discussion and Conclusion. Compared with the baseline that used home information, the ML algorithms leveraging interview content achieved substantially better performance in detecting participants' risk of school violence (Table 3). In addition, the n-gram features that captured both semantic and context information were shown to be more predictive than word categories. The PIRC assessment was used for collecting background information and was therefore less predictive. The feature selection identified a set of key predictors that helped improve the performance significantly to 98.02% (p-value=0.028). The majority of predictors were related to discussion of participants' past violent behaviors (e.g., fight, threat to others). They also captured participants' violent thoughts (e.g., want to hurt anyone, burn house) that could be warning signs of school violence.

By analyzing the content from participant interviews, the machine learning models showed capacity for detecting risk of school violence for individual students. In addition, identification of key predictors revealed multiple warning markers that could deliver useful insights into potential causes of school violence.

TABLE 2

Descriptive statistics of the scale questionnaires and transcripts.

| | | | Average Number Across all Interviews | | | |
|---|---|---|---|---|---|---|
| Scale | Items | Questions | Words | Words per Question | Words per Answer | Ans./Que. Ratio |
| BRACHA | 14 | 25 ± 12 | 537 ± 324 | 12 ± 3 | 10 ± 8 | 0.78 ± 0.62 |
| SSS | 14 | 56 ± 22 | 1117 ± 541 | 11 ± 2 | 10 ± 7 | 1.04 ± 0.68 |
| PIRC | 22 | 25 ± 11 | 551 ± 280 | 10 ± 2 | 13 ± 10 | 1.43 ± 1.04 |

TABLE 3

Classification performance of the machine learning algorithms with different feature sets.

| | | | Nested Ten-fold Cross Validation Performance [%] | | | | | |
|---|---|---|---|---|---|---|---|---|
| Features | | | LR + L2 | LR + L1 | SVM-P | SVM-R | RF | p-value* |
| Demographics + socioeconomic status | | | 67.89 | 68.79 | 67.57 | 62.92 | 62.14 | 3.0E−3 |
| | LIWC | WEC | LR + L2 | LR + L1 | SVM-P | SVM-R | RF | p-value* |
| Word Category | ✓ | x | 77.15 | 67.77 | 76.95 | 73.01 | 73.72 | 1.2E−2 |
| | x | ✓ | 81.76 | 77.86 | 85.26 | 80.50 | 77.78 | 2.2E−2 |
| | ✓ | ✓ | 87.16 | 84.28 | 87.04 | 80.54 | 82.37 | 0.15 |
| | BRACHA | SSS | PIRC | LR + L2 | LR + L1 | SVM-P | SVM-R | RF | p-value* |
| N-gram | ✓ | x | x | 92.43 | 87.90 | 93.03 | 89.60 | 91.06 | N/A |
| | x | ✓ | x | 81.91 | 73.72 | 81.52 | 82.03 | 74.03 | 3.5E−2 |
| | x | x | ✓ | 60.36 | 67.73 | 60.91 | 58.08 | 65.37 | 3.0E−3 |
| | ✓ | ✓ | x | 90.50 | 80.02 | 90.11 | 87.71 | 83.88 | 0.24 |

TABLE 3-continued

Classification performance of the machine learning algorithms with different feature sets.

| Features | | | Nested Ten-fold Cross Validation Performance [%] | | | | | |
|---|---|---|---|---|---|---|---|---|
| | | | LR + L2 | LR + L1 | SVM-P | SVM-R | RF | p-value* |
| ✓ | x | ✓ | 88.93 | 80.73 | 89.36 | 84.91 | 84.12 | 0.24 |
| x | ✓ | ✓ | 84.71 | 77.03 | 83.88 | 82.43 | 75.30 | 6.2E-2 |
| ✓ | ✓ | ✓ | 91.06 | 78.25 | 91.33 | 86.49 | 83.90 | 0.29 |

*Paired T-test of the performance difference between the best algorithm (SVM-P + BRACHA n-gram) and the others.

TABLE 4

Key n-gram predictors and their implication.

| Rank | n-gram | Interpretation & Examples |
|---|---|---|
| 1 | you ever make a | From the question "have you ever make a write or verbal threat" |
| 2 | to hurt anyone | From answers like "try/want to hurt anyone" |
| 3 | ever be in a fight | From the question "have you ever be in a fight" |
| 4 | house | From answers like "burn down my house/blow your house up" |
| 7 | you want to kill | From questions like "you want to kill her/people" |
| 13 | how | From questions like "how many fights/how often" |
| 21 | a while | Answers like "once in a while" for "how often do you get into fight" |

Technology Development Example III

Methods: 103 participants were recruited through Cincinnati Children's Hospital Medical Center (CCHMC) from psychiatry outpatient clinics, the inpatient units, and the emergency department. Participants (ages 12-18) were active students in 74 traditional schools (i.e. non-online education). Collateral was gathered from guardians before participants were evaluated. School risk evaluations were performed with each participant, and audio recordings from the evaluations were later transcribed and manually annotated. The BRACHA (School Version) and the School Safety Scale (SSS), both 14-item scales, were used. A template of open-ended questions was also used. Results: This analysis included 103 participants whom were recruited from 74 different schools. Of the 103 students evaluated, 55 were found to be moderate to high risk to others and 48 were found to be low risk to others. Both the BRACHA and the SSS were highly correlated with risk of violence to others (Pearson correlations>0.82). There were significant differences in BRACHA and SSS total scores between low risk and high risk to others groups (p-values<0.001 under unpaired t-test). In particular, there were significant differences in individual SSS items between the two groups (p-value<0.001). Of these items, Previous Violent Behavior (Pearson Correlation=0.80), Impulsivity (0.69), School Problems (0.64), and Negative Attitudes (0.61) showed high correlation with risk to others. The novel machine learning algorithm achieved an AUC of 91.02% when using the interview content to predict risk of school violence, and the AUC increased to 91.45% when demographic and socio-economic data were added. Conclusion: Our study indicates that the BRACHA and SSS are clinically useful for assessing risk for school violence. The machine learning algorithm was highly accurate in assessing school violence risk.

Figure 5:
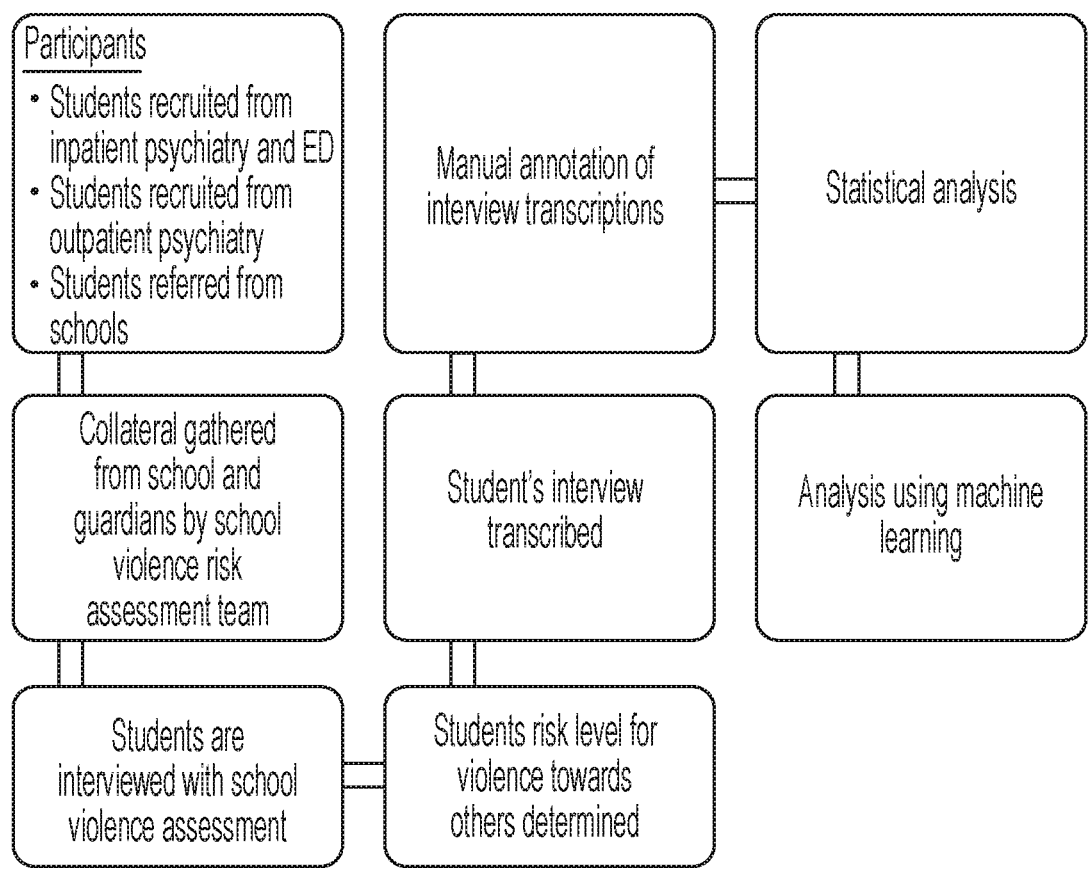
FIG. 5 provides a flow diagram of an exemplary method according to an embodiment and technology development example provided herein.

This work is an expansion of our previous child and adolescent violence research from the hospital into the schools [16, 20, 21]. The design for this study was approved by the institutional review board (IRB) at Cincinnati Children's Hospital Medical Center (CCHMC, study ID: 2014-5033). FIG. 5 presents a diagrammed overview of the study.

Students were evaluated using a school risk assessment protocol developed in our earlier research [21]. When a student a major or minor behavioral change or aggression towards self or others, the school mental health counselor contacted the risk assessment research team to set up a meeting time to discuss the reason for concern along the student's background information. The research team then contacted the students' guardians to discuss the study and possible participation of the student. Students were also recruited from the CCHMC's inpatient psychiatry units, outpatient clinics, and the emergency department. The research team obtained permission from the student's clinical team prior to discussing the study with the student and guardians. If all parties agreed to participate, signed informed consent and assent forms were obtained in person, along with signed releases of information forms.

After consent was received, the guardian was interviewed first to gather collateral information that would help the research team better evaluate the student. Some questions for the guardian were taken from the same risk assessment questions used to evaluate the student. The collateral from the guardians was later used during the students' interview, allowing the interviewers to clinically determine the most effective way to phrase the questions, as well as to compare the accuracy between what was reported by the guardian and student. Students were identified only with a subject number and their names were never spoken during the recorded interviews to help keep the students' identities anonymous. The interviews with the students were audio recorded after which the recordings were immediately placed on the secured computer and sent to be transcribed.

Our research team provided clinical impressions and recommendations to the school, without divulging the risk level of the student to avoid possible stigma. We also provided recommendations to the guardians as well as referrals for treatment when indicated. Currently there are no validity data in a large U.S. prospective school research study. Hence, our research team documented risk levels to self or others (low or moderate/high) based on clinical judgement rather than based on automatic cutoff scores from the risk scales. This study defined a "high risk" student as a student for whom a moderate or high risk level was given for physical aggression at school.

Participants. We prospectively recruited 103 middle and high school students who were from 74 schools from Ohio, Kentucky, Indiana, and Tennessee during this study period. All legal guardians consented and all students assented after meeting in person and discussing the study (consent/assent rate=100%). Based on clinical judgments, 47 students (45.6%) were considered high risk to self among 103 students. Fifty five students (53.4%) were considered high risk to others among the 103 students. Table 1 shows the characteristics of the participants. Forty-eight percent were male. The moderate/high risk to others group only significantly differed from the low risk to other group in regards to home income (p<0.05). Although these two groups differed with the proportion of included Hispanic participants, the finding warrants further investigation due to having a total of only seven Hispanic participants. There was no significant difference in high risk and low risk groups in the amount of students recruited from the inpatient and outpatient units (p=0.79).

Inclusion Criteria. Participants of this study were between the ages of 12 and 18. They were required to be enrolled in school, excluding those that are homeschooled or enrolled in online school. Participants were also not to be in state custody. Participants of all races and socioeconomic standings were included. Participants' legal guardians provided informed consent in person and gave permission (releases of information) for the collection of information from schools, the providing of information to schools, and for the evaluation of the student. Assent was also obtained from the student prior to the interview. For this study, students were either directly referred to the research team from their school or recruited from our inpatient units, outpatient clinic, or emergency department. A referral was made when there was any concern for the student due to a significant behavioral change or verbal/physical aggression. Referrals were also made when students displayed behavioral changes of becoming quiet, withdrawn, or isolated which can be warning signs of school violence. All students, regardless of possible risk level, were included. Students who had a primary concern of self-harm thoughts or behaviors were also included.

Materials. For each student, a Demographic Form along with two 14-item school safety scales, the Brief Rating of Aggression by Children and Adolescents (BRACHA) and the School Safety Scale (SSS) were used [16, 21]. In addition, the Psychiatric Intake Response Center (PIRC) assessment, which has been used at our hospital over the past decade, was also used. Collateral information was gathered from the guardians using questions taken from the two school safety scales, BRACHA and SSS, and the PIRC assessment.

The BRACHA is a 14-item instrument, which has predictive performance for aggression by children and adolescents in the hospital [16, 20]. The SSS was developed by modifying the Historical-Clinical-Risk Management-20 (HCR-20) scale [22]. The HCR-20 is a widely used, valid, and reliable scale for the prediction of violence by adults and includes ten historical items (irreversible), five current clinical items (reversible), and five future risk management (reversible) items [22]. The SSS's original purpose was to assess risk and protective factors for potential against medical advice discharges for children and adolescents from the psychiatry units [23]. The HCR-20, the BRACHA, and the SSS overlap in areas that were previously identified as important correlates to youth violence [24]. The BRACHA and SSS have both been used for about a decade at our hospital, yet they have not been used for school safety prior to our research [21].

The PIRC assessment, which is not a scale, allowed for a semi-structured format that helped us to gather background information with open-ended and direct questions. The scales and assessment used in our study are consistent with the information from five domains including community, school, peer, family, and individual [8]. The PIRC assessment incorporated the FBI's Four-Pronged Assessment Model to examine the personality of the student (behavior characteristics and traits), school dynamics, social dynamics, and family dynamics while we interviewed the student and gathered collateral information from relevant sources [25].

The school risk assessment employed a combination of both broad and specific questions related to violence risk factors. Questions were asked in an open-ended format so that the student would provide a more detailed answer than "yes" or "no". In cases where the student did answer with a yes or no, he or she was asked to explain his or her answer. The wording of the questions was dependent on the student's age and cognitive level. Questions were also asked based on background information gathered before the interviews from the schools and guardians.

Manual Annotation and Statistical Analysis. The interviews of the subjects were recorded and immediately transcribed in a text format. Key phrases and words associated with school violence risk were manually extracted from the transcribed interviews. The sole focus during annotation was to identify students' behaviors, attitudes, feelings, and uses of technology (social media and video games) [24].

School violence-related patterns were identified within the students' interviews, and were double annotated using a double annotation schema [26]. Double annotation assures a more uniform measurement than a single annotation and is a standard method used in clinical research [27]. Annotators first identified key words and phrases associated with students' behaviors from the interviews by following a guideline developed by the research team. Each extracted word or phrase was standardized by being assigned to one of 11 pre-defined categories. After annotation was completed, a consensus was established by a child and adolescent forensic psychiatrist to resolve any discrepancies between the annotators' decisions. A reference set of school violence-related patterns was generated from the consensus of the extracted words and phrases and their corresponding categories.

Statistical analysis was performed to assess the relationship between the BRACHA and the SSS scores, the key linguistic factors, and the risk of school violence. To demonstrate the distribution of demographics, descriptive analysis was performed (See Table 5). Two sample t test compared the numerical variables (e.g., SSS) between high risk and low risk students. A ×2 test was used to compare the categorical variables (e.g., linguistic patterns). Pearson's correlation coefficients were performed to assess the association between the BRACHA/SSS scores, the linguistic factors, and the risk levels.

The 11 categories for annotation are: (1) Psychiatric diagnosis or symptoms, (2) Negative feelings, thoughts, or acts of subject, (3) Negative feelings, thoughts, or acts of others, (4) feelings, thoughts, or acts of subject, (5) Illegal acts or contact with the judicial system subject, (6) Violent acts or thoughts of subject, (7) Self-harm thoughts or acts of subject, (8) Family discord or tragedies, (9) Verbal or physical response due to emotions of subject, (10) Violent media or video games, (11) Protective factors (e.g., family support, counselor).

Results. The total BRACHA score and the total SSS score were significantly correlated with the risk to others (p values<0.05) but not with risk to self. More specifically, the following items within the SSS were significantly associated with school violence risk to others: violent thoughts, impulsivity, compliance with treatment, insight, support, school problems, substance use, psychopathy, negative attitudes, active symptoms of mental illness, stressors, violent behavior, and access to weapons (p values<0.05). Additionally, the analysis on the annotations (Table 6) showed that there were significant language differences between the high risk and low risk groups for the following five (out of 11) annotation categories: negative feelings/thoughts/acts of subject, negative feelings/thoughts/acts of others, illegal acts or contact with the judicial system by subject, violent acts or thoughts of subject, and violent media or video games (p values<0.05).

We piloted machine learning, which leverages advanced computerized algorithms, to analyze student interviews and predict students' risk of school violence. Given the content of transcribed interviews, a multivariate logistic regression algorithm with L2 normalization was used for predicting risk of school violence for individual students. Nested ten-fold cross-validation was utilized to train and evaluate the logistic regression algorithm, where the model parameters were optimized with grid search parameterization. For model evaluation, we used the area under the receiver operating characteristic curve (AUC) as the primary measure. The algorithm achieved an AUC of 91.02% when using the interview content to predict risk of school violence, and the AUC increased to 91.45% when demographic and socioeconomic data were added.

In addition to multivariate logistic regression with L2 normalization, embodiments may use other machine learning algorithms including naïve Bayes, logistic regression with different normalizations such as L1 normalization, gradient boosted variants (e.g., gradient boosted machine, gradient boosted logistic regression), support vector machine, classification and regression trees, random forests, artificial neural networks, and deep learning variants (e.g., convolutional neural networks and recurrent neural networks).

In addition to AUC, embodiments may use other evaluation metrics including positive predictive value, sensitivity, negative predictive value, specificity, and F-measure.

Discussion. The high AUC achieved by machine learning suggests its potential to assist school violence risk assessment which could help minimize clinical subjectivity and maximize predictive validity in clinical practice [28-31]. The other problem with current methods for assessing violence risk in schools is that there is not a widely accepted risk assessment [32]. There are several violence risk assessments for children and adolescents, but they have been developed for use in hospitals [16, 20] and within the juvenile justice system [32]. With these considerations in mind, our research team developed novel school safety scales, the BRACHA and SSS, in order to assist schools in being able to assess risk within a reasonable amount of time (30 minutes on average) including gathering collateral information from the school and legal guardian. We used these scales in order to determine the gold standard risk level for each subject and to begin.

Although independent of race, school violence risk level was dependent on home income level [33]. Risk of violence towards others was inversely related to a lower socioeconomic status in our study. Previous research has correlated poverty, aggression, and disruptive behaviors [34]. Race was not correlated with school violence risk level in this study which is similar to our past findings for hospital aggression [16]. Surprisingly, being male was not associated with school violence risk to others level in contrast to our previous findings [16].

The total scores of the BRACHA and SSS as well as 13 of the 14 items of the SSS were significantly correlated with the overall judgment on school violence risk to others but not with risk to self. Importantly, these results provide evidence that the SSS and BRACHA can be clinically used to specifically assess risk of violence to others at schools. These findings were expected since we methodically gathered aggression histories with the BRACHA and SSS [16, 21].

Five of the eleven annotation categories were significantly associated school violence risk levels. Of these five significant categories, the most interesting finding was that negative feelings, thoughts, or acts of others were significantly associated with violent risk to others similar to our first study [21]. This category captures the participant's perceptions of others intentions or actions. For this category, it is likely that our annotation process was able to detect subtle negative misinterpretations, cognitive distortions, being bullied, or actual emotional or physical abuse by adults towards the participants.

In a large comparative study of violence risk assessment tools including 68 studies and 25,980 participants, the AUC's of the most widely used risk assessments ranged from 0.54 to 0.83 with median AUC's ranging from 0.66 to 0.78 [35]. More specifically, the gold standard violence risk assessment for adults (HCR-20) had a median AUC of 0.70 (with 8 studies) while the gold standard risk assessment for adolescents, the SAVRY, had a median AUC of 0.71 (with 8 studies) [35]. For our study, the machine learning AUC was 0.91 which is superior to the AUC's of adolescent and adult violence risk assessment [35]. This striking finding provided evidence that the machine learning algorithm (based only on the transcript of the participant's interview) was almost as accurate in assessing risk levels as a full assessment by our research team including gathering collateral from parents and the school, review of records when available, and scoring the SSS and BRACHA.

Although our sample size was large enough to develop the algorithm for machine learning, we estimate that we will require 336 subjects to fully develop the automated system for use in schools. Another limitation was that we did not have prospective aggression data from schools for our subjects. Given our funding and resource limitations, collecting prospective aggression data was not feasible. Since past violence is the strongest risk factor for future violence [36, 37], we ensured that our risk assessments meticulously collected violence and behavioral histories from the students, guardians, and schools. Another limitation was that we aimed to prevent mild, moderate, and severe school violence rather than developing a research method to solely prevent school shootings. Since the base rate of school shootings is low, we did not specifically aim to develop automatic text-based data analysis to prevent these rare events [38-40]. Our risk assessments were focused on preventing any type of physical aggression towards others at schools. Nevertheless, we evaluated risk factors with the BRACHA and SSS that could be highly relevant to potential school shootings.

Conclusions. Our pilot study provided evidence for the potential use of machine learning to augment structured professional judgment when assessing for school violence risk. In this study, we compared the risk levels determined by the research team based on outside information and record review (when available) versus risk levels determined by the machine learning analysis of the transcribed student interviews. The machine learning algorithm was accurate (AUC=91%) with assessing school violence risk when compared to structured professional judgment approach. In the next two years, we expect that the machine learning algorithm will become more accurate with even higher AUC's. Ultimately, our goal is to spread the use of the machine learning technology to schools in the future to augment structured professional judgment to more effectively prevent school violence.

TABLE 5

Demographics

| Characteristic | Low Risk to Self | Moderate-High Risk to Self | Low Risk to Others | Moderate-High Risk to Others |
|---|---|---|---|---|
| Sex | | | | |
| Female | 19 | 34 | 28 | 25 |
| Male | 37 | 13 | 20 | 30 |
| Race | | | | |
| Caucasian | 40 | 33 | 33 | 40 |
| African American | 7 | 8 | 6 | 9 |
| Biracial | 8 | 4 | 7 | 5 |
| Asian | 1 | 2 | 2 | 1 |
| Hispanic | | | | |
| No | 54 | 42 | 42 | 54 |
| Yes | 2 | 5 | 6 | 1 |
| Public Assistance | | | | |
| No | 47 | 32 | 41 | 38 |
| Yes | 9 | 15 | 7 | 17 |
| Annual Household Income | | | | |
| Less than $20,000 | 11 | 14 | 8 | 17 |
| $20,001-$40,000 | 16 | 22 | 15 | 23 |
| $40,001-$60,000 | 5 | 5 | 7 | 3 |
| $60,001-$90,000 | 12 | 0 | 4 | 8 |
| More than $90,000 | 12 | 6 | 14 | 4 |
| Education | | | | |
| Advanced Graduate/Professional Degree | 7 | 4 | 8 | 3 |
| College Graduate | 13 | 13 | 15 | 11 |
| Some College | 22 | 13 | 10 | 25 |
| High School Grad/GRE | 8 | 15 | 11 | 12 |
| Some High School | 6 | 2 | 4 | 4 |

| $X^2$-Test | Self-Risk (p-value) | Risk to Others (p-value) |
|---|---|---|
| Sex | 0.0001* | 0.1920 |
| Race | 0.6525 | 0.6895 |
| Hispanic | 0.1558 | 0.0317* |
| Public Assistance | 0.0582 | 0.0506 |
| Home Income | 0.0055 | 0.0113* |
| Home Education | 0.1631 | 0.0630 |

TABLE 6

Annotation Categories and Risk to Others

| Category | Pearson Correlation | Unpaired T-test (p-value) |
|---|---|---|
| Psychiatric diagnosis or symptoms | −0.035 | 0.722 |
| Negative feelings, thoughts, or acts of subject | 0.480 | 2.95E−07 |
| Negative feelings, thoughts or acts of others | 0.401 | 2.70E−05 |
| Illegal acts or contact with judicial system by subject | 0.314 | 0.00123 |
| Self-harm thoughts or acts of subject | −0.0856 | 0.390 |
| Verbal or physical response due to emotions of subject | −0.113 | 0.256 |
| Family discord or tragedies | 0.192 | 0.0521 |
| Positive feelings, thoughts, or acts of subject | 0.0415 | 0.677 |
| Violent media or video games | 0.443 | 2.83E−06 |
| Violent acts or thoughts of subject | 0.676 | 4.48E−15 |
| Protective factors (e.g., family support, counselor) | −0.0551 | 0.580 |

It will be appreciated that the disclosed embodiments are only exemplary in nature and it will be within the scope of those of ordinary skill to modify the disclosed embodiments without departing from the scope of the invention(s) as claimed. Further, while objects and advantages of the disclosure are provided herein, it will be apparent that it is not necessary to meet such objects and advantages to practice the invention(s) as claimed, since the disclosure may provide additional objects and advantages that have not been expressly disclosed herein.

TABLE OF REFERENCES

References [1]-[40] are listed below. The disclosure of each is incorporated by reference.

1. Musu-Gillette, Zhang, A., Wang, K., Zhang, J., and Oudekerk, B. A. (2017). Indicators of School Crime and Safety: 2016. National Center for Education Statistics, U.S. Department of Education, and Bureau of Justice Statistics, Office of Justice Programs, U.S. Department of Justice. Washington, D.C.
2. Centers for Disease Control and Prevention (CDC), 1992-2014 School-Associated Violent Death Surveillance System (SAVD-SS), retrieved July 2016 from http://www.cdc.gov/injury/wisqars/index.html; and Federal Bureau of Investigation and Bureau of Justice Statistics, Supplementary Homicide Reports (SHR), preliminary data (August 2016).
3. National Association of School Psychologists. (2010). Crisis and safety resources. Retrieved Apr. 3, 2014 from http://www.nasponline.org/educators/index.aspx#crisis.
4. McCoy D C, Roy A L, Sirkman G M. Neighborhood crime and school climate as predictors of elementary school academic quality: a cross-lagged panel analysis. Am J Community Psychol. 2013 September; 52(1-2):128-40. doi: 10.1007/s10464-013-9583-5.
5. Burdick-Will J. School Violent Crime and Academic Achievement in Chicago. Social Educ. 2013 October; 86(4). doi: 10.1177/0038040713494225.
6. Strom I F, Thoresen S, Wentzel-Larsen T, Dyb G. Violence, bullying and academic achievement: a study of 15-year-old adolescents and their school environment. Child Abuse Negl. 2013 April; 37(4):243-51. doi: 10.1016/j.chiabu.2012.10.010. Epub 2013 Jan. 6.
7. Gottfredson G D, Cook P J, N A C: Schools and Prevention. In: Welsh B C, Farrington D P (Eds): Crime and Prevention. Oxford, United Kingdom: Oxford University Press, pp. 269-287, 2000.
8. Tanner-Smith E E, Wilson S J, Lipsey M W: Risk Factors and Crime. In: Maguire M, Morgan R, Reiner R (Eds) The Oxford Handbook of Criminology. 5th edn, Oxford, Oxford University Press, pp. 89-111, 2012.
9. Mytton J, DiGuiseppi C, Gough D, Taylor R, Logan S. School-based secondary prevention programmes for preventing violence. Cochrane Database Syst Rev. 2006 Jul. 19(3): CD004606.
10. Park-Higgerson H K, Perumean-Chaney S E, Bartolucci A A, Grimley D M, Singh K P. The evaluation of school-based violence prevention programs: a meta-analysis. J Sch Health. 2008 September; 78(9):465-79; quiz 518-20. doi: 10.1111/j.1746-1561.2008.00332.x.
11. Borum R, Cornell D G, Modzeleski W, Jimerson S R: What can be done about school shootings? A Review of the Evidence. Educational Researcher 39(1): 27-37, 2010.
12. Nekvasil E K, Cornell D G: Student reports of peer threats of violence: Prevalence and outcomes. Journal of School Violence 11(4): 357-375, 2012.

13. Bernes K B, Bardick A D: Conducting adolescent violence risk assessments: A framework for school counselors. Professional School Counseling 10(4): 419-427, 2007.
14. McGowan M R, Horn R A, Mellott R N: The predictive validity of the structured assessment of violence risk in youth in secondary educational settings. Psychological Assessment 23(2): 478-486, 2011.
15. Monahan J, Steadman H: Violence Risk Assessment: A Quarter Century of Research. In: Frost L, Bonnie R (Eds.): The Evolution of Mental Health Law. Washington: American Psychological Association, pp. 195-211, 2001. doi:10.1037/10414-010.
16. Barzman D, Brackenbury L, Sonnier L, Schnell B, Cassedy A, Salisbury S, Sorter M, Mossman D: Brief rating of aggression by children and adolescents (BRACHA): Development of a Tool to Assess Risk of Inpatients' Aggressive Behavior. Journal of the American Academy of Psychiatry and the Law 39(2): 170-179, 2011.
17. Xia F, Yetisgen-Yildiz: Clinical corpus annotation: challenges and strategies. Proc. Of Third Workshop on Building and Evaluating Resources for Biomedical Text Mining of the International Conference on Language Resources and Evaluation, 2012.
18. Kors J A, Clematide S, Akhondi S A, van Mulligen E M, Rebholz-Schuhmann D. A multilingual gold-standard corpus for biomedical concept recognition: the Mantra GSC. J Am Med Inform Assoc. 2015 September; 22(5):948-56. doi: 10.1093/jamia/ocv037.
19. Wilbur W J, Rzhetsky A, Shatkay H. New directions in biomedical text annotation: definitions, guidelines and corpus construction. BMC Bioinformatics. 2006 Jul. 25; 7:356.
20. Barzman D, Mossman D, Sonnier L, Sorter M: Brief rating of aggression by children and adolescents (BRACHA): A reliability study. Journal of the American Academy of Psychiatry and the Law 40:374-382, 2012.
21. Barzman, D. H., Ni, Y., Griffey, M., Patel, B., Warren, A., Latessa, E., & Sorter, M. (2017). A Pilot Study on Developing a Standardized and Sensitive School Violence Risk Assessment with Manual Annotation. Psychiatric Quarterly, 88(3), 447-457.
22. Douglas K S, Blanchard A J E, Guy L S, Reeves K A, Weir J (2010). HCR-20 Violence Risk Assessment Scheme: Overview and Annotated Bibliography. Retrieved from http://kdouglas.files.wordpress.com/2007/10/hcr-20-annotated-biblio-sept-2010.pdf.
23. Delgado S V, Barzman D, Gehle M, Caring M, Sorter M D, Kowatch R, Finding R: Characteristics of Discharges Against Medical Advice from Acute Inpatient Psychiatric Units for Children and Adolescents. Poster presented at the annual meeting of the American Academy of Child and Adolescent Psychiatry, Boston, 2007.
24. Hilterman E L, Nicholls T L, van Nieuwenhuizen C: Predictive performance of Risk Assessments in Juvenile Offenders: Comparing the SAVRY, PCL:YV, and YLS/CMI With Unstructured Clinical Assessments. Assessment, 2014.
25. Federal Bureau of Investigation. (1999). The School Shooter: A Threat Assessment Perspective. (Federal Bureau of Investigation, ED446352). Quantico Va. Retrieved from http://www.fbi.gov/library/school/school2.pdf.
26. Lingren T, Deleger L, Molnar K, Zhai H, Meinzen-Derr J, Kaiser M, Stoutenborough L, Li Q, Solti I: Evaluating the impact of pre-annotation on annotation speed and potential bias: Natural language processing gold standard development for clinical named entity recognition in clinical trial announcements. Journal of the American Medical Informatics Association, 2013. doi:10.1136/amiajn1-2013-001837.
27. Deleger, L., K. Molnar, G. Savova, F. Xia, T. Lingren, Q. Li, K. Marsolo, et al. 2012. "Large-scale evaluation of automated clinical note de-identification and its impact on information extraction." Journal of the American Medical Informatics Association: JAMIA 20 (1): 84-94.
28. Ganzert, S., Guttmann, J., Kersting, K., Kuhlen, R., Putensen, C., Sydow, M., & Kramer, S. (2002). Analysis of respiratory pressure-volume curves in intensive care medicine using inductive machine learning. Artificial intelligence in medicine, 26(1), 69-86.
29. Zacharaki, E. I., Wang, S., Chawla, S., Soo Yoo, D., Wolf, R., Melhem, E. R. & Davatzikos, C. (2009). Classification of brain tumor type and grade using Mill texture and shape a machine learning scheme. Magn Reson Med, 62(6):1609-18.
30. Zrimec, T., & Kononenko, I. (2004). Feasibility analysis of machine learning medical diagnosis from aura images. In Proc. Int. Conf. KIRLIONICS-98 (Abstracts) (pp. 10-11).
31. Sara, N B, Halland R, Igel C, Alstrup S High-School Dropout Prediction Using Machine Learning: A Danish Large-scale Study European Symposium on Artificial Neural Networks, Computational Intelligence and Machine Learning. Bruges (Belgium), 22-24 Apr. 2015.
32. Welsh J L, Schmidt F, McKinnon L, Chattha H K, Meyers J R A Comparative Study of Adolescent Risk Assessment Instruments Predictive and Incremental Validity Assessment. 2008 March; 15(1):104-15.
33. Molnar, B. E., Cerda, M., Roberts, A. L., & Buka, S. L. (2008). Effects of neighborhood resources on aggressive and delinquent behaviors among urban youths. American Journal of Public Health, 98, 1086-1093. doi:10.2105/AJPH.2006.098913
34. Reed M. O., Jakubovski E., Johnson J. A., & Bloch M. H. Predictor of long-term school-based behavioral outcomes in the multimodal treatment study of children with attention-deficit/hyperactivity disorder. J Child Adolesc Psychopharmacol, 27(4): 296-309.
35. Singh, J. P., Grann M., & Fazel S. A comparative study of violence risk assessment tools: a systematic review and metaregression analysis of 68 studies involving 25,980 participants. Clin Psychol Rev, 31: 499-513, 2011.
36. Mossman, D. Assessing prediction of violence: being accurate about accuracy. J Consult Clin Psychol, 62 (4):783-792, 1994.
37. Janofsky, J. S., Spears, S., & Neubauer, D. N. (1988). Psychiatrists' accuracy in predicting violent behavior on an inpatient unit. Hospital and Community Psychiatry, 39, 1090-1094.
38. Neuman, Y., Assaf, D., Cohen Y., & Knoll, J. Profiling school shooters: automatic text-based analysis. Frontiers in Psychiatry 6: 1-5, 2015.
39. Shultz, J. M., Cohen, A. M., Muschert, G. W., and Flores de Apodaca, Roberto. Fatal school shootings and the epidemiological context of firearm mortality in the United States Disaster Health. 2013 April-December; 1(2): 84-101.
40. Flannery D J, Modzeleski W, Kretschmar J M. Violence and school shootings. Curr Psychiatry Rep. 2013 January; 15(1):331.

41. Varma S, et al. Bias in error estimation when using cross-validation for model selection. Bioinformatics. 2006; 7:91.

What is claimed is:

1. An automated method for assessing risk of violence comprising:
   receiving, in response to questions from a pre-set questionnaire, a digital natural language transcript of an individual;
   converting the digital natural language transcript to a predetermined form;
   extracting, by using a linguistic inquiry and word count dictionary to map specific words into categories and using word embedding to cluster words into word categories, linguistic features from the digital natural language transcript, wherein the linguistic features comprise a first linguistic feature set comprising semantic meaning categories and a second linguistic feature set comprising term frequency and inverse transcript frequency;
   assigning the extracted features automatically to at least one of a plurality of predetermined categories, wherein the predetermined categories include at least one of the following:
   expression of negative feelings, thoughts, or acts of others,
   expression of positive feelings, thoughts, or acts of the individual,
   expression of family discord or tragedies,
   expression of violent acts or thoughts by the individual, and
   expression of protective factors;
   training, by nested cross-validation, a machine learning engine comprising a multivariate logistic regression with L1 and L2 normalization;
   producing, based on scoring the assigned features by the machine learning engine, a risk of violence score for the individual to prevent violence; and
   transmitting, to a user based on the risk of violence score, an actionable recommendation.

2. The method of claim 1, wherein converting of the digital natural language transcript to the predetermined form comprises at least one of:
   tokenizing and lemmatizing the digital natural language transcript;
   removing punctuation from the digital natural language transcript; and
   converting negated and temporal terms.

3. The method of claim 1, wherein the extracting of a second linguistic feature set further comprises capturing both semantic and context information.

4. The method of claim 1, wherein the predetermined categories further comprise at least one of the following:
   expression of psychiatric diagnosis or symptoms,
   expression of negative feelings, thoughts, or acts of the individual
   expression of illegal acts or contact with the judicial system by the individual,
   engaging in violent acts or thoughts of the individual,
   expression of self-harm thoughts or acts of the individual, and
   violent media or video games.

5. The method of claim 1, wherein the predetermined categories further comprise expression of verbal or physical response due to emotions of the individual.

6. The method of claim 1, wherein the machine learning engine further comprises at least one of:
   support vector machines with polynomial and radial basis function kernels;
   artificial neural networks;
   decision trees; and
   random forests.

7. The method of claim 6, wherein the machine learning engine further comprises the use of a best-first search algorithm to select and identify key features most closely indicative of risk of school violence.

8. The method of claim 1, wherein the questions comprise an open-ended format.

9. The method of claim 1, wherein the questions are based on an age of the individual.

10. The method of claim 1, wherein the questions are based on a cognitive level of the individual.

* * * * *